United States Patent [19]

Newman

[11] Patent Number: 5,295,235

[45] Date of Patent: Mar. 15, 1994

[54] POLYGON ENGINE FOR UPDATING COMPUTER GRAPHIC DISPLAY EMPLOYING COMPRESSED BIT MAP DATA

[76] Inventor: Steve Newman, 1520 Sand Hill Rd. #210, Palo Alto, Calif. 94304

[21] Appl. No.: 835,548

[22] Filed: Feb. 14, 1992

[51] Int. Cl.⁵ .............................................. G06F 5/01
[52] U.S. Cl. .................................... 395/133; 395/131; 382/56; 358/261.1
[58] Field of Search ............... 395/133, 122, 134, 123, 395/121, 131, 126; 382/56; 358/261.1

[56] References Cited

U.S. PATENT DOCUMENTS

| | | | |
|---|---|---|---|
| 4,709,231 | 11/1987 | Sakaibara et al. | 340/729 |
| 4,792,981 | 12/1988 | Cahill, III et al. | 382/56 |
| 4,847,677 | 7/1989 | Music et al. | 358/13 |
| 4,855,938 | 8/1989 | Gonzalez-Lopez et al. | 395/122 |
| 4,885,703 | 12/1989 | Deering | 395/122 |
| 5,129,051 | 7/1992 | Cain | 395/133 |

OTHER PUBLICATIONS

Computer Graphics Principles and Practice, 2nd Edition, James D. Foley, ©1990, p. 845.

*Primary Examiner*—Heather R. Herndon
*Assistant Examiner*—Michael Smith
*Attorney, Agent, or Firm*—Krass & Young

[57] ABSTRACT

The polygon engine of this invention is a technique for rendering a computer graphic display using a compressed data format. A display list of objects for the next frame is converted into a list of spans for each horizontal line of the display. The polygon engine converts the list of spans for all objects into a set of run-length-encoded bit map lines for the next frame. Conflicts between overlapping objects are resolved based upon a depth value of the corresponding objects. Any remaining unspecified pixels are filled with a predetermined background color. Lastly, the polygon engine updates the frame buffer to correspond to this set of run-length-encoded bit map lines, preferably by comparing run-length-encoded bit map lines for the next frame with those for the current frame and writing only changed pixels into the frame buffer. An alternative embodiment of this invention uses compressed data in the form of trapezoids whose parallel sides are horizontal. A hardware extension of the polygon engine uses a run-length-encoded bit map frame buffer to specify the display.

13 Claims, 6 Drawing Sheets

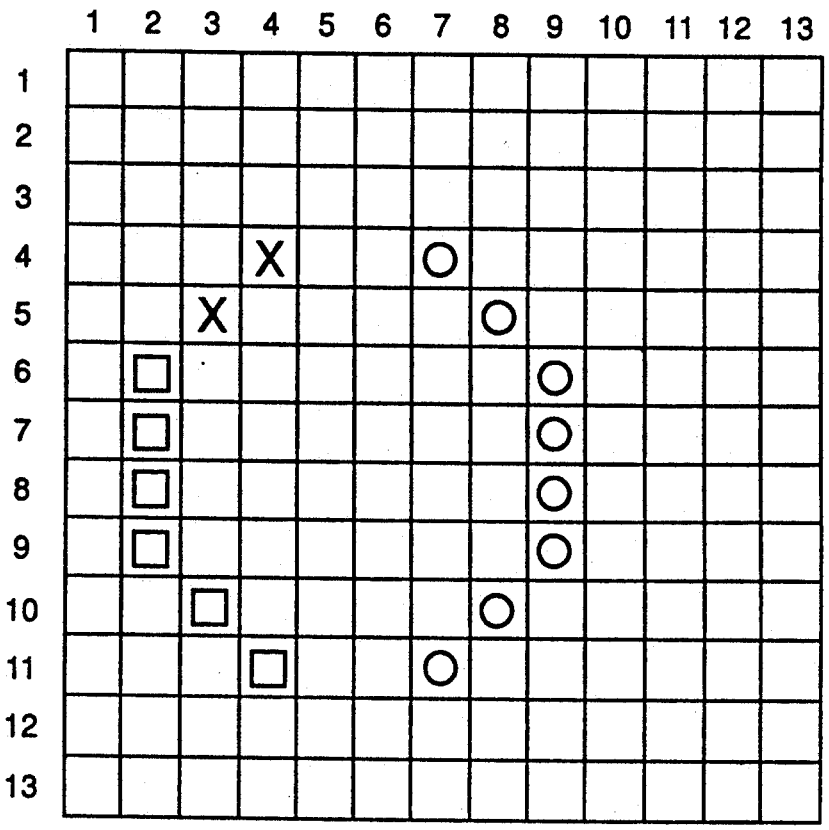
FIG - 5
FIG - 6
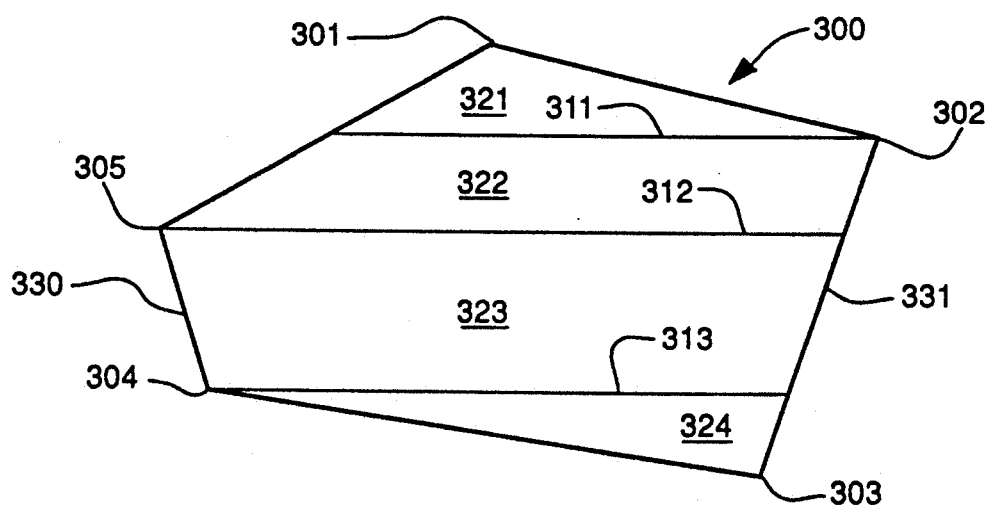

POLYGON ENGINE FOR UPDATING COMPUTER GRAPHIC DISPLAY EMPLOYING COMPRESSED BIT MAP DATA

TECHNICAL FIELD OF THE INVENTION

The technical field of the invention is computer graphic displays and more particularly such displays used in animation.

BACKGROUND OF THE INVENTION

This invention is in the field of computer graphic displays. It is typical in computer graphic displays to employ a bit map to designate the display generated. A bit map is a portion of computer memory having one or more bits of storage allocated to each pixel or picture element of the display. The number of bits allocated to each pixel depends upon the number of allowable colors. A monochrome display, which permits only black and white images, needs only one bit per pixel. A display permitting 256 different colors needs eight bits per pixel. Because typical computer graphic displays employ a rectangular grid of pixels, bit maps are often similarly organized. A single horizontal line of the display or of the bit map is called a scan line. This refers to the conventional manner of rendering computer graphic displays via scanning horizontal lines in a cathode ray tube.

Many computer graphic displays such as are used in desk top computers, home and arcade video games and engineering workstations render the display via a frame buffer. A frame buffer is a bit map which is accessible by both the central processor and by the display hardware. The central processor accesses the bit map to specify the display rendered and possibly to determine the current value of one or more pixels. Special purpose display hardware reads the bit map, converts the data for each pixel into an indication of the color to be displayed, and controls the color rendered by the display. This rendering process often uses a mapping table to translate the bits for each pixel into a color or shade. This mapping table may be fixed, or it may be under the control of the central processor. Often the number of memory bits used for each pixel is under the control of the central processor. This process operates in synchronism with the scan of the color cathode ray tube. Thus the special purpose display hardware creates an image corresponding to the data stored in the frame buffer. It is conventional to grant the special purpose display hardware priority in accessing the bit map. This prevents visual anomalies in the display caused by changing the bits corresponding to a particular pixel while that pixel is being displayed.

To display an image using this technique, the corresponding pattern of data bits must be placed into the frame buffer. Generally, the process starts from a high-level description of the image. This high-level description is then rendered into the frame buffer by software or specialized hardware that places the corresponding pattern of data in the frame buffer. The special purpose display hardware reads the frame buffer and controls the display accordingly. Display of an animated image starts from a new high-level description or updated high-level description for each frame of the animation. Each high-level description is rendered into the frame buffer in turn.

This process can be very slow. The rendering process is time-consuming. First, the display has priority. This reduces the time available to the central processor for writing into the frame buffer. Second, the frame buffer is often connected to the central processor via a relatively slow system bus rather than the direct access accorded the main memory. Third, there is simply a lot of data required to specify an entire frame of the computer display, particularly if color is involved. In the case of animation, generally either the moving objects are small, movements are slow or some jerkiness is involved.

There is a need in the art to provide a manner of specifying and updating computer displays, particularly color displays. A major field of work in this area is the development of efficient rendering techniques in either software or hardware. It would be very useful to provide a manner of improved rendering of computer graphic displays.

SUMMARY OF THE INVENTION

The polygon engine of this invention is a technique for rendering a computer graphic display. The preferred embodiment is a method which employs a run-length-encoded compressed format for specification of the display.

The polygon engine begins with the specification of a display list of objects for the next frame. The polygon engine then optionally sorts these objects from left to right in the next step. Each object is then converted into a list of spans for each horizontal line of the display. A span defines a group of horizontally adjacent pixels of the object having the same color.

The polygon engine converts the list of spans for all objects into a set of run-length-encoded bit map lines for the next frame. Each run-length-bit map line indicates for a corresponding horizontal line of the display in left to right order the number of consecutive pixels having the same color and that color. This conversion begins by merging the lists of spans for all objects into a single master list of spans. This master list of spans includes for each horizontal line each span for each object occurring on that horizontal line. Each horizontal line of the master list of spans is sorted left to right. The optional left to right sorting of the objects speeds this span sorting. Conflicts between overlapping objects are resolved based upon a depth value of the corresponding objects. Any remaining unspecified pixels are filled with a predetermined background color.

Lastly, the polygon engine updates the frame buffer to correspond to this set of run-length-encoded bit map lines. The simplest manner of updating the frame buffer includes writing data corresponding to each run-length-encoded bit map line into the corresponding scan line in the frame buffer. In the preferred embodiment, the run-length-encoded bit map lines for the next frame are compared with run-length-encoded bit map lines for the current frame. This permits determination of each pixel having a different color in the next frame. The polygon engine writes only data for these changed pixels into the corresponding locations in the frame buffer.

An alternative embodiment of this invention employs a display list of only polygons. The polygon engine converts each polygon into a set of trapezoids whose parallel sides are horizontal. This may be accomplished by drawing a horizontal line through each vertex of the polygon. The polygon engine converts the set of trapezoids for all polygons into a set of nonoverlapping trapezoids. The set of nonoverlapping trapezoids may require drawing additional horizontal lines to specify different overlapping and nonoverlapping parts of trapezoids from separate objects. This would also include resolving the color of pixels occurring in overlapping trapezoids based on the depth of the corresponding object. Lastly, the polygon engine updates the frame buffer to correspond to the set of nonoverlapping trapezoids. This updating process preferably takes place by the polygon engine forming a set of difference trapezoids corresponding to the difference between two frames. The polygon engine using the trapezoid compression technique may support anti-aliasing by oversampling. The polygon engine using the trapezoid compression technique may also support Z buffering for each trapezoid to resolve the depth of the trapezoids.

The polygon engine supports a hardware extension using a run-length-encoded bit map frame buffer to specify the display. This embodiment of the polygon engine includes a run-length-encoded bit map memory. The run-length-encoded bit map memory stores plural run-length-encoded elements corresponding to the display to be generated. Each run-length-encoded element consist of a count indicative of a number of consecutive pixels and their common color. Each run-length-encoded element is recalled in turn. The recalled element specifies the color for a number of consecutive pixels corresponding to the count. An address pointer recalls the next run-length-encoded element upon generation of the video signal for the last pixel of the count. A memory selection circuit permits access to the run-length-encoded bit map at a lower priority than the address pointer. The polygon engine resets the address latch to the first run-length-encoded element at the end of each frame, thereby repeating the frame.

BRIEF DESCRIPTION OF THE DRAWINGS

These and other objects and aspects of the present invention will become clear from the following description of the invention, in which:

FIGS. 3a to 3d illustrate schematically an example of an image formed from a display list;

FIG. 5 illustrates an example of the specification of changed pixels between two frames;

FIG. 6 illustrates an example of rendering a polygon into a plurality of horizontally disposed trapezoids.

DETAILED DESCRIPTION OF THE PREFERRED EMBODIMENTS

Figures 1, 2:
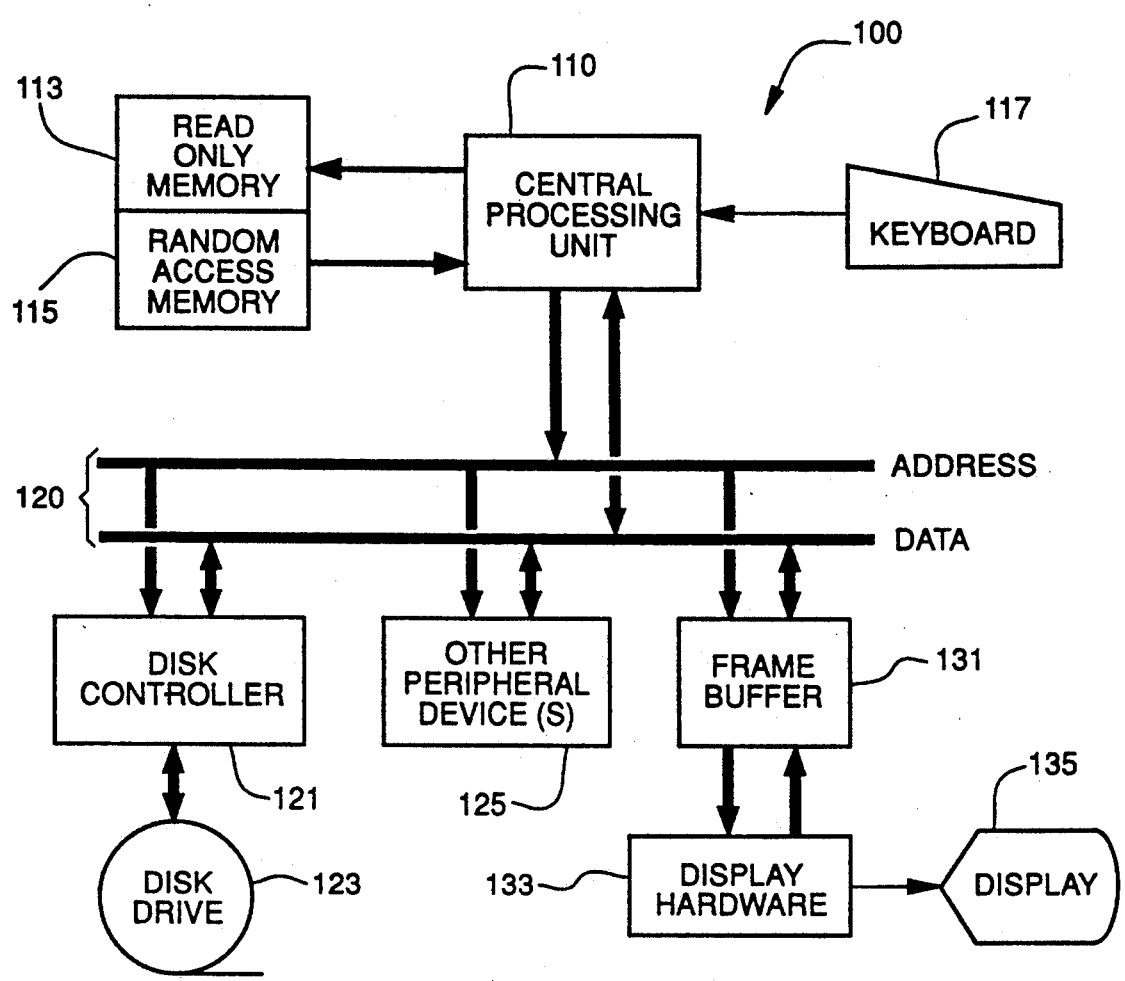
FIG. 1 illustrates in block diagram form a computer of the type known in the art to which this invention is applicable.
FIG. 2 illustrates schematically the contents of a bit map used in an example of run-length encoding of image data.

FIG. 1 illustrates in block diagram form a computer of the type known in the art to which the present invention is applicable. Computer 100 includes a central processing unit 110 that is bidirectionally coupled to a memory including read only memory 113 and random access read/write memory 115. Central processing unit 110 receives user inputs from keyboard 117. Computer 100 includes system bus 120, which consists of separate address and data buses, for communication between various parts. The typical computer 100 includes disk controller 121 and disk drive 123 that provide nonvolatile program and data storage. Computer 100 may also include a number of other peripheral device(s) 125, such as a printer port, a serial port, a modem, etc. Computer 100 further includes a display system comprising frame buffer 131, display hardware 133 and display 135. Frame buffer 131 includes a bit map of the desired display. Frame buffer 131 may be changed by central processing unit 110 via system bus 120. Display hardware 133 also accesses frame buffer 131. Display hardware 133 generates signals for control of display 135, which is usually a color cathode ray tube, to produce a display corresponding to the data in frame buffer 131. The typical desk top personal computer or engineering workstation to which this invention is applicable provides certain core functions on a fixed motherboard and permits the attachment of plug-in circuit boards to the system bus to provide additional functions.

The present invention relates to the process of specifying the data in the frame buffer. This invention is particularly applicable to computer systems using color animation. The speed of animation is limited by the speed of the computer in specifying the bit map within the frame buffer. The description of the invention begins with a discussion of some areas of background technology.

Many computer graphic images have the property that adjacent pixels tend to have the same color. Hence adjacent memory locations in a bit map will tend to contain the same data. A compression technique known as run-length-encoding compresses bit map images by taking advantage of this tendency. A run-length-encoded bit map consists of a series of (count, color) elements, each of which defines a group of horizontally adjacent pixels having the same color. FIG. 2 is an example of a simple bit map. Its run-length-encoded form is give below in Table 1.

TABLE 1

(5, white)
(1, white) (3, gray) (1, white)
(1, white) (3, gray) (1, white)
(1, white) (3, gray) (1, white)
(5, white)

As shown in FIG. 2 and Table 1, the first line of this bit map consists of 5 adjacent white pixels. The next three lines of this bit map include a single white pixel, three gray pixels (illustrated in FIG. 2 by 'X's) and a single white pixel. Finally, the last line consists of 5 adjacent white pixels. Note the run-length-encoded form of the bit map includes a list for each horizontal scan line. Each of these lists specifies the pixel colors for that horizontal scan line.

A common high-level descriptive representation of an image is a display list. A display list is a list of object specifications. Each object specification describes a particular object in the image such as a line segment, rectangle, polygon, bit mapped image, etc. The object specification defines the location, size, color, and specific type and shape of the image element. The particular parameters attached to an object depend on the object type. A line segment may be described by the coordinates of its two end points, and its color. A rectangle may be described by the coordinates of two diagonally opposite corners and its color. A circle may be described by the coordinates of its center, its radius and its color. Other objects are similarly specified by their parameters.

The image is created from the display list by overlaying the display objects. This may be done in the order in which the objects appears in the display list. Alternatively, each object may have an associated depth value that determines the order in which they are drawn. Objects that are "deeper", or further in the background, are drawn first. Part or all of these objects deeper objects may then be covered up by foreground objects that are drawn on top of them.

FIGS. 3a to 3d illustrate an example of the rendering of such a display list. Suppose high-level software produces a display list consisting of a circle and two rectangles as shown in Table 2.

TABLE 2

1. Rectangle (3,2; 8,7: gray, depth 10)
2. Rectangle (6,6; 12,12: black, depth 5)
3. Circle (5,7: radius 4, red, depth 0)

Figures 3A, 3B:
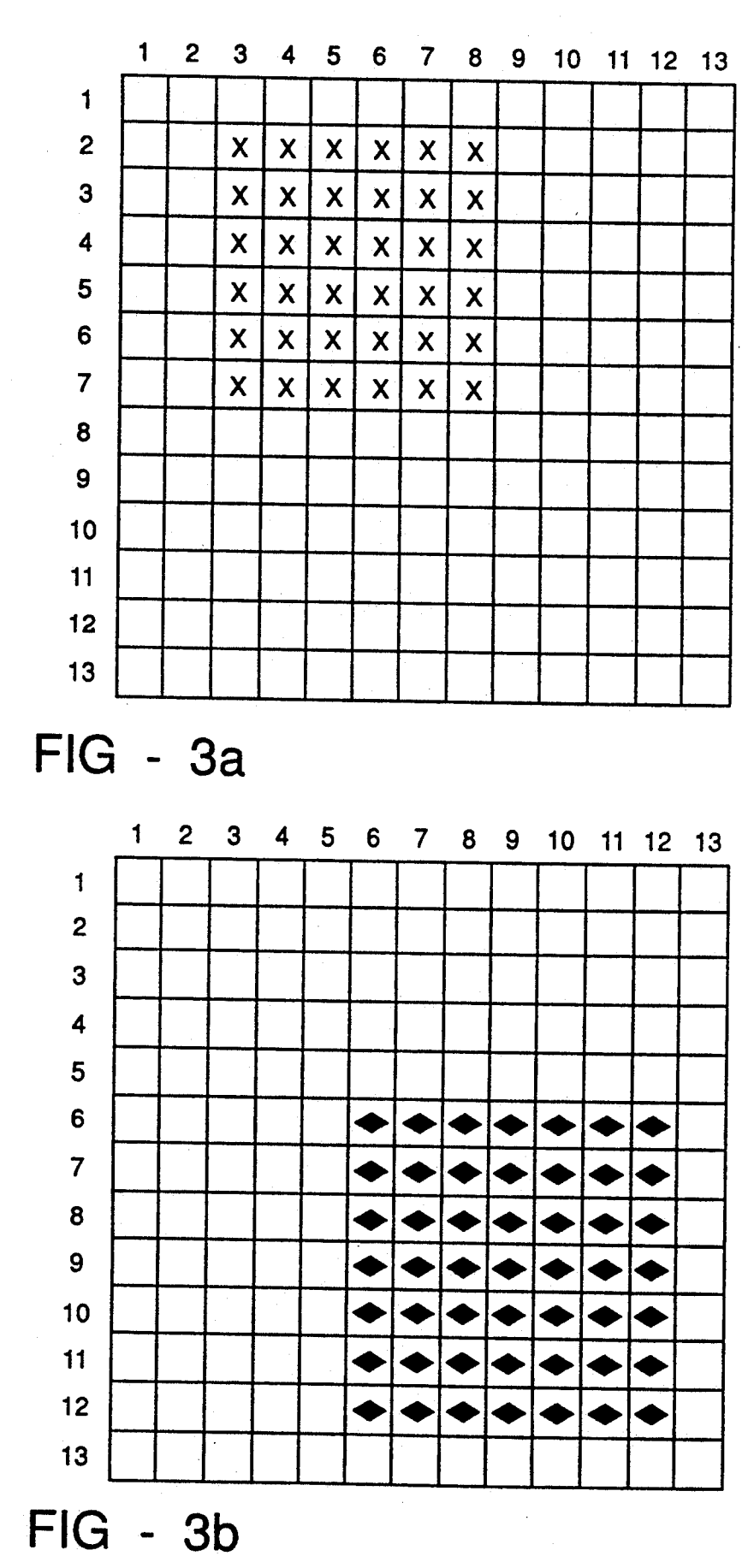
Figures 3C, 3D:
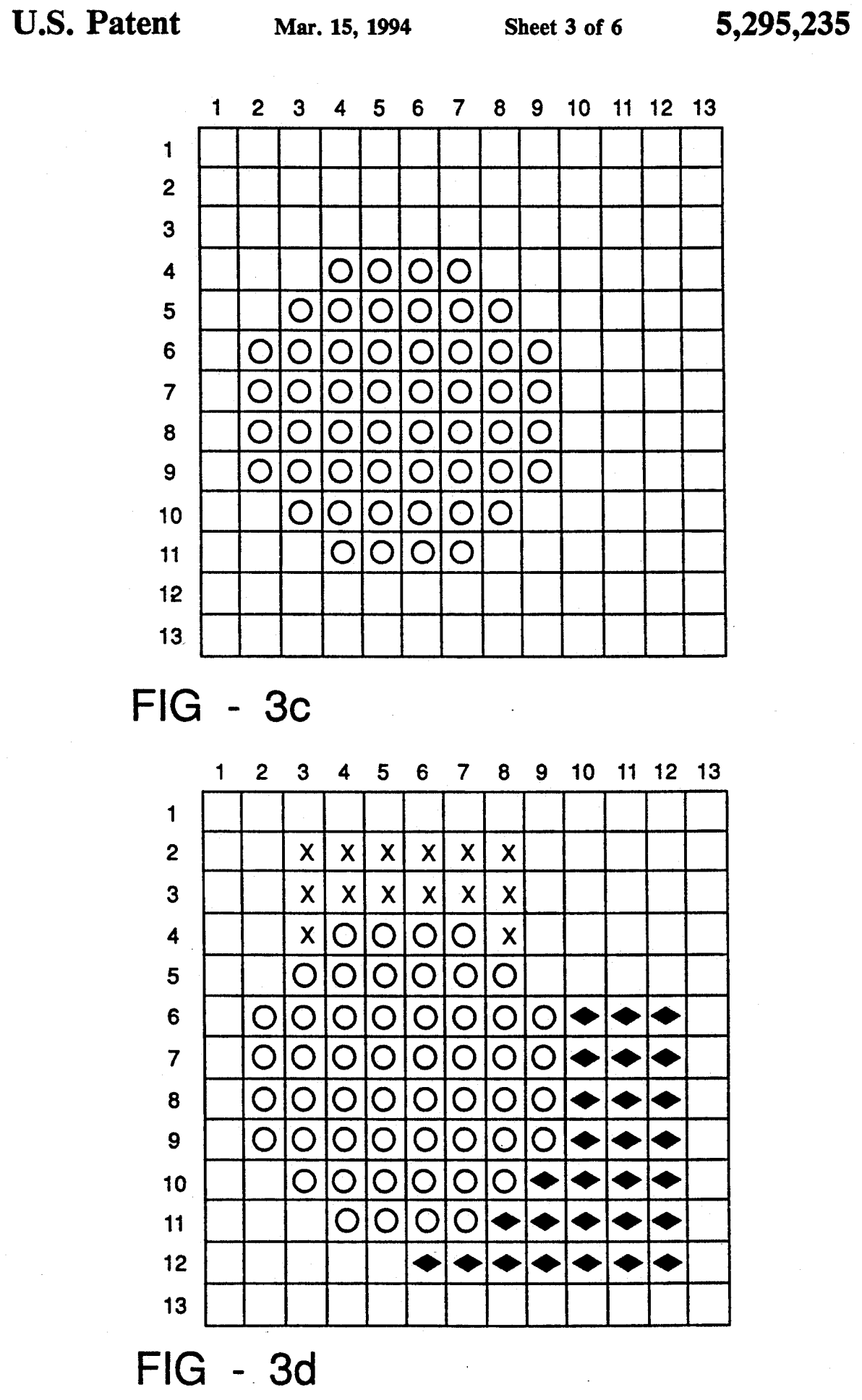

The first object is a rectangle having a first corner at the coordinates (3,2) and a second corner at the coordinates (8,7). This rectangle is gray, illustrated in FIG. 3a by 'X's, and has a depth of 10. The second object is a rectangle with its first corner at (6,6) and its second corner at (12,12). This rectangle is black, illustrated in FIG. 3b by diamonds, and has a depth of 5. The final object in the display list is a circle centered at coordinates (5,7) having a radius of 4. This circle is red, illustrated in FIG. 3c by 'O's, and has a depth of 0. FIG. 3d illustrates the entire image. Note that the circle is in front of both rectangles. Not shown in FIG. 3d is the fact that the black rectangle is in front of the gray rectangle. Note also that in FIGS. 3c and 3d the smooth edges of the circle are approximated at pixel boundaries. This is a universal property of all rendering techniques.

Animation of this image is very easy in the display list. Suppose the circle is moving horizontally and the two rectangles are stationary. The display list can be altered to refer to the new location of the circle by merely changing the column coordinate of the circle center. Thus the new object specification for the circle could be Circle (6,7: radius 4, red, depth 0). This change in the display list involves alteration of perhaps one or two bytes of data.

Rendering the newly specified image according to the prior art is a much longer process. First, the entire screen is cleared. This requires writing the background color into all 169 pixels. Then the gray rectangle is written into the bit map. Next the black rectangle is written into the bit map. Lastly the circle at its new position is written into the bit map. This process involves specification of the color data for 306 pixels: 169 background pixels to clear the screen; 36 pixels for the gray rectangle; 49 pixels for the black rectangle; and 52 pixels for the red circle. This process is thus much slower than updating the display list.

There is a further disadvantage to this prior art technique. If an image is rendered directly into the frame buffer using standard techniques, then the user is able to observe the intermediate stages of the rendering when only some of the objects in the display list have been drawn. This results in a flickering display at best, and complete distraction at worst. The problem is particularly severe when employing animation, such as used in games and flight simulators. Many computer systems employ an auxiliary bit map of the same capacity as the frame buffer to prevent a flickering display. The image is first rendered into the auxiliary bit map, and then the rendered image is copied into the frame buffer in one step. This eliminates the flicker but requires additional time for the copy step. Other computer systems provide hardware that contains two frame buffers. At any given time one frame buffer is driving the display while the other serves as the auxiliary bit map. After each frame is rendered the roles of the two frame buffers are swapped. This eliminates the need for the copy step at the expense of the additional hardware. It is readily apparent that all of these techniques involve compromise in display speed or hardware.

Note that this example of the rendering process involved writing color data to some pixels that are later overwritten, in a few cases overwritten twice. The simple case of this example used the painter's algorithm, in which the last written color of each pixel controls the displayed color, for resolving the color for these pixels. This process of writing from back to front may not be convenient in all cases. In many three dimensional applications the depth value of a single object varies over its extent, as in a polygon that is not parallel to the plane of the display screen. A prior art technique known as Z buffering has been proposed to deal with these depth resolution problems. With Z buffering, a depth value is stored with each pixel in the frame buffer or auxiliary bit map. When writing into the frame buffer or auxiliary bit map, the depth value of the object being drawn at each pixel is compared with the depth value for the corresponding pixel in the frame buffer. If the depth value of the pixel in the frame buffer is greater than that of the object, then the object is drawn at that pixel and the stored depth value is updated to that of the object. Otherwise, the object is not drawn at that pixel since the previously drawn pixel is in front of the object. This ensures that the pixel drawn in the frame buffer is that having the least depth, that is, the pixel which is closest to the viewer. This process incidentally may eliminate some redundant pixel write operations by not overwriting some frame buffers pixels with object pixels of greater depth.

This Z buffering technique works in all cases, but it takes a lot of extra memory and is slow. The Z buffering requires extra memory because each pixel must have a stored depth value. Because computer graphic images typically have thousands of pixels, the Z buffering technique requires a lot of memory. Rendering images using the Z buffering is slow because a depth comparison is required for each pixel. Thus while Z buffering solves the depth resolution problem it introduces new problems.

This invention translates a display-list description of an image into the corresponding data pattern and places this pattern in the frame buffer. This is called a polygon engine and takes its name from the fact that in many applications the display list is simply a list of polygonal shapes, locations and associated colors. Polygons are used because they are simple and general-purpose. Any shape can be approximated by a polygon if the polygon is allowed many short edges. Polygon display lists are often used in flight simulators, CAD/CAM systems, 3-D animation packages, and video games. While the polygon engine of this invention is capable of rendering other sorts of shapes as well, the preferred implementation is optimized for polygons, and this is where it will probably see the most use.

Figure 4:
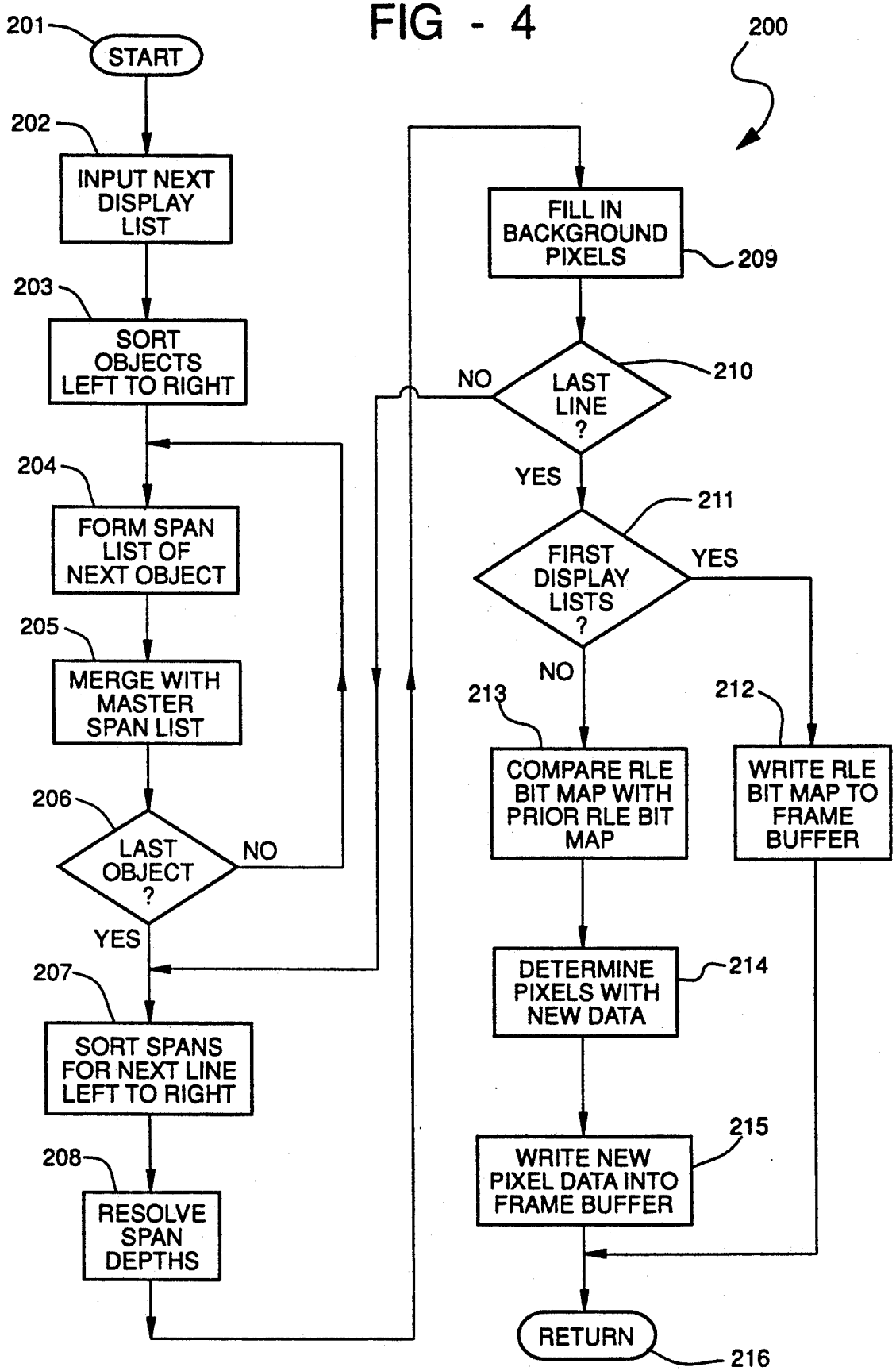
FIG. 4 illustrates in flow chart form the processes of this invention.

FIG. 4 illustrates the image rendering process of an example of the polygon engine of this invention in flow chart form. Program 200 illustrated in FIG. 4 is not intended to show the exact details of this control program. Instead, program 200 is intended to illustrate only the general steps employed in this program for practicing this invention. Some conventional features are not illustrated in FIG. 4. Those skilled in the art of computer graphic programming would be enabled to provide the exact details of the control program from program 200 illustrated here and the other descriptions of the present application once the selection of the central processor unit is made. Program 200 as illustrated in FIG. 4 is a subroutine which runs each time an altered display is specified.

The polygon engine operates on several data structures: a display list generated by higher-level software; an internal span list; two internal run-length-encoded bit maps; and the frame buffer. To initially render a display list, the polygon engine transforms each object into a span list, forms a master span list, transforms the master span list into a run-length-encoded bit map, and copies the run-length-encoded bit map to the frame buffer. Further images are rendered by comparison of a newly generated run-length-encoded bit map with the prior run-length-encoded bit map. The changed pixels are determined and the new data for only these changed pixels is copied into the frame buffer.

Following call and initiation (start block 201), the polygon engine inputs the next display list (processing block 202). In the case of initiation of the computer graphics program, this next display list is new. Before creation of the set of span lists, the polygon engine sorts the objects in the display list into left-to-right order (processing block 203). This causes spans to be added to the span list in generally left-to-right order. This may not be exactly left-to-right order because the left edge of a span is only approximately the same as the left edge of the corresponding object. This object sorting makes a later sorting of the spans more efficient. In the case of the example illustrated in FIGS. 3a to 3d the sorted left-to-right order of objects based on their left edge is: circle, gray rectangle, black rectangle.

A span list describes an image in terms of a set of spans for each scanline. A span is a (position, count, depth, color) group defining a set of horizontally adjacent pixels at the specified position in a scanline and having the specified color. The depth value indicates which span is to take priority when several spans overlap. A span list is a set of spans for plural horizontal lines. The polygon engine forms a span list from the next object (processing block 204). In the case of the first pass through this loop the next object is the first object. The span list is created by taking the object in the display list and slicing it into horizontal rows of pixels corresponding to the horizontal scan lines. Each horizontal scan line is then converted into a span or spans. Note that some objects may have plural separate portions in a single scan line. Each span consists of the offset from the left edge of the bit map (indicating position), the number of pixels in the span, the depth value, and the color: (offset, count, depth, color). The spans refer only to objects in the display list, thus the background is omitted from the span list for an image. The object, if it occupies plural horizontal scan lines, becomes a list of plural spans.

The polygon engine next merges the span list for the current object with a master span list (processing block 205). This master scan list includes all the spans for each prior object. The spans of the current object are merely added to the end of the list of spans for the corresponding horizontal lines. All that is necessary at this point is to keep the spans properly registered on horizontal lines. If this is not the last object (decision block 206), then program repeats processing blocks 204, 205 and 206 for the next object. If this is the last object, the polygon engine continues by converting the span list into a run-length-encoded bit map.

The resulting master span list for the example illustrated in FIGS. 3a to 3d is shown in Table 3.

TABLE 3

| Scanline 1: | no spans |
|---|---|
| Scanline 2: | (3,6,10, gray) |
| Scanline 3: | (3,6,10, gray) |
| Scanline 4: | (4,4,0, red) (3,6,10, gray) |
| Scanline 5: | (3,6,0, red) (3,6,10, gray) |
| Scanline 6: | (2,8,0, red) (3,6,10, gray) (6,7,5, black) |
| Scanline 7: | (2,8,0, red) (3,6,10, gray) (6,7,5, black) |
| Scanline 8: | (2,8,0, red) (6,7,5, black) |
| Scanline 9: | (2,8,0, red) (6,7,5, black) |
| Scanline 10: | (3,6,0, red) (6,7,5, black) |
| Scanline 11: | (4,4,0, red) (6,7,5, black) |
| Scanline 12: | (6,7,5, black) |
| Scanline 13: | no spans |

Note that a span list shares many properties with a run-length-encoded bit map. Both describe an image in terms of horizontally adjacent sets of pixels having the same color. Both group those sets of pixels according to the scanline on which they appear. A run-length-encoded bit map is essentially a span list in which the spans do not overlap, every pixel is covered by a span, and the spans are sorted into left-to-right order within each scanline. To transform the span list into a run-length-encoded bit map, the polygon engine first sorts the spans for each scanline into left-to-right order (processing block 207). In the case of ties, the span with the smaller depth value (i.e., the foremost one) comes first. In this example, the spans are all already in order except that the two spans on scanline 4 need to be switched. These spans were generally in order within each horizontal scan line due to the left-to-right sorting of the objects in processing block 203.

The polygon engine then resolves the depth of the spans to produce a span having only a single color value per pixel (processing block 208). When a single pixel within the horizontal scan line has two color values from two spans, the color value from the span having the least depth is selected. Tie in the depth value may be broken in any consistent manner, such as favoring the object appearing later in the display list. The polygon engine then fills in the gaps between spans with a specified background color (processing block 209). This results in a run-length encoded line for the current horizontal line. If that was not the last horizontal scan line (decision block 210), then the program repeats processing blocks 207, 208, 209 and 210 for the next scan line. This loop repeats until all the horizontal scan lines have the spans converted into a run-length-encoded line. The resulting set of run-length-encoded lines forms a run-length-encoded bit map. Table 4 shows the resultant run-length-encoded bit map for the example illustrated in FIG. 3d and the master span list of Table 3. Note Table 4 assumes the background color is white.

TABLE 4

| Scanline 1: | (13, white) |
|---|---|

TABLE 4-continued

| Scanline 2: | (2, white) (6, gray) (5, white) |
| Scanline 3: | (2, white) (6, gray) (5, white) |
| Scanline 4: | (2, white) (1, gray) (4, red) (1,gray) (5, white) |
| Scanline 5: | (2, white) (6, red) (5, white) |
| Scanline 6: | (1, white) (8, red) (3, black) (1, white) |
| Scanline 7: | (1, white) (8, red) (3, black) (1, white) |
| Scanline 8: | (1, white) (8, red) (3, black) (1, white) |
| Scanline 9: | (1, white) (8, red) (3, black) (1, white) |
| Scanline 10: | (2, white) (6, red) (4, black) (1, white) |
| Scanline 11: | (3, white) (4, red) (5, black) (1, white) |
| Scanline 12: | (5, white) (7, black) (1, white) |
| Scanline 13: | (13, white) |

The polygon engine then tests to determine if this is the first display list (decision block 211). When rendering the first display list, there is no prior run-length-encoded bit map for comparison. In that case, program 100 writes the run-length-encoded bit map into the frame buffer (processing block 212). The process of copying a run-length-encoded bit map into the frame buffer is straightforward. Each entry in the run-length-encoded bit map specifies that a series of pixels in the frame buffer are to be filled with a particular color. A simple software loop converts the length and color information into plural color writes into the frame buffer. This is the process by which the polygon engine renders the initial image represented by the first display list.

To render subsequent images, the polygon engine takes advantage of the fact that most screen pixels do not change color from one image to the next. Writing the appropriate color value to each pixel can be the slowest part of the rendering process. Rendering the image is computationally very simple. However, the frame buffer often occupies many storage locations, and access to the memory holding the frame buffer is often slower than access to main memory. Hence any technique that can eliminate the need to store a new color value for each pixel in each frame is potentially valuable.

The polygon engine preferably uses two run-length-encoded bit maps so that alternate images in the animation can be rendered into alternate bit maps. For each image except the first, the polygon engine has available a prior run-length-encoded bit map corresponding to the previous image as well as that of the new image. This previous image currently resides in the frame buffer. The polygon engine compares the present run-length-encoded bit map with the prior run-length-encoded bit map (processing block 213). The polygon engine determines the pixels that have new, different data in the current run-length-encoded bit map as compared to the prior run-length-encoded bit map (processing block 214). FIG. 5 illustrates the results of this comparison for the example where the circle is moving horizontally and the two rectangles are stationary. The new object specification for the circle in the updated display list is Circle (6,7: radius 4 red, depth 0). FIG. 5 shows the new pixels resulting from this movement of the circle. There are two new gray pixels marked by x's, 6 new white background pixels marked by small squares and 8 new red pixels marked by small circles.

Upon determination of these new data pixels, the polygon engine writes into the frame buffer the colors for only those pixels that have changed (processing block 215). Referring to the example illustrated in FIG. 5, only 16 pixels need be written into the frame buffer rather than the 306 pixels needed to clear the screen and completely respecify the two rectangles and the circle. Whether a initial image is rendered or a new image is rendered, the process of the polygon engine is complete. Program 200 ends at return block 216, which returns control to the calling program.

In an alternative embodiment, the comparison of the current run-length-encoded bit map with the prior run-length-encoded bit map is eliminated. In this alternative embodiment the run-length-encoded bit map is written into the frame buffer in the manner of processing block 212 for every frame. This technique eliminates blocks 211, 213, 214 and 215 from program 200. This technique is advantageous over the prior art because the conversion of the span lists into the current run-length-encoded bit map eliminates redundant writing to pixels in the frame buffer. Thus each pixel is written only once because overlapping objects are resolved before writing to the frame buffer. Note that this technique does not have the additional advantage of the preferred embodiment that writes only changed pixels into the frame buffer.

The embodiment of the polygon engine is advantageous over the prior art due to a few key points. Note that there is substantial advantage to employing the conversion of each display list to corresponding span lists and run-length-encoded bit maps even if the run-length-encoded bit map comparison is not used.

Overlapping objects are not drawn redundantly. In most prior art rendering techniques, each object in turn is drawn in its entirety. This drawing may take place in the frame buffer or in an auxiliary bit map that is then copied into the frame buffer. In a region where several objects overlap, the work of drawing all but the foremost object is wasted. For example, in the example above, it would be pointless to draw the lower half of the gray square, since it would just be overwritten when the circle is drawn. The polygon engine discards the covered-up part of an overlapping object when it resolves the set of span lists into a run-length-encoded bit map. Because the polygon engine deals with pixels in groups rather than individually, it can efficiently detect overlapping objects and discard the hidden sections. This speeds the image display by eliminating redundant writes into the frame buffer or auxiliary bit map. This is advantageous over the prior art even if unchanged pixels are rewritten into the frame buffer, as in the alternative embodiment.

No auxiliary buffer bit map is needed in the polygon engine. The polygon engine does not write to the frame buffer until the final step of copying the run-length-encoded bit map into the frame buffer. This avoids flicker without requiring a full auxiliary bit map. The step of rendering a run-length-encoded bit map into the frame buffer is computationally very simple. There is only at most very little degradation in speed using this rendering process than in using a full auxiliary bit map in software. Further, there is also at most only a small degradation in speed using this rendering technique as compared with a hardware auxiliary bit map. There may be an increase in speed depending on the relative speed of the central processing unit and the memory bus, because reading the run-length-encoded bit map from memory requires fewer memory cycles than reading a normal bit map. Thus the polygon engine captures the useful property of an auxiliary bit map, that of drawing to the frame buffer in a single step, without requiring a lot of additional memory or any additional hardware.

The preferred embodiment of the polygon engine writes to only the frame buffer pixels that have changed. Writing to the frame buffer is generally slower than writing to main memory. The frame buffer occupies a large number of memory locations. Thus the simple act of writing to each pixel location can take a large amount of time. This applies whether or not an auxiliary bit map or dual frame buffers are used. The polygon engine is able to efficiently determine which pixels have actually changed state from one frame to the next by comparing run-length-encoded bit maps. This determination of changed pixels using the run-length-encoded bit maps is faster than a similar comparison using uncompressed bit maps, since each run-length-encoded bit map is much smaller than an uncompressed bit map. This determination of changed pixels permits the polygon engine to spend time writing to only those memory locations that actually contain a changed pixel. This speeds the image rendering process since generally less than all the pixels differ in the new image.

It is a simple extension to support display list objects having a repeated sequence of pixel colors instead of just a single pixel color. Using such a repeated sequence of pixel colors is known as tiling because the pixel color sequence can be viewed as a tile laid upon the display. Such repeated sequences of pixel colors can have two dimensional definitions. Some desk top personal computers and engineering work stations which support only monochrome images use tiling to provide greater variety in the display. The display lists, span lists, and run-length-encoded bit maps include the designation of a pattern in place of a single color name. The display hardware renders the pattern as the corresponding set of pixel values. This allows patterned and textured objects to be displayed.

An alternative embodiment of this invention employs horizontally-oriented trapezoids. This alternative embodiment works when the display list contains nothing but polygons. The graphic data is compressed by representation as a set of horizontally-oriented trapezoids. The parallel sides of these trapezoids are disposed horizontally. Note that these trapezoids correspond generally to vertically adjacent spans. The trapezoid representation substitutes for both the span list encoding and the run-length-encoding previously described.

The sequence of operations is very similar to the method described in conjunction with FIG. 4. First, the display is specified by a list of polygons. As previously stated, any shape can be approximated by a polygon if the polygon is allowed many short edges. The polygons are optionally sorted left to right. Each polygon is then converted into a set of trapezoids. Any polygon can be sliced into trapezoids by drawing a horizontal line through each vertex of the polygon. This process is illustrated in FIG. 6. Polygon 300 includes vertices 301 to 305. Horizontal lines 311, 312 and 313 are drawn through vertices 302, 305 and 304, respectively. This results in a division of polygon 300 into trapezoids 321, 322, 323 and 324. Note that trapezoids 321 and 324 are collapsed down to triangles. These trapezoids can be considered as having one parallel side with a length of zero pixels. Not illustrated in FIG. 6 is the possible existence of a vertically collapsed trapezoid having a height of one pixel.

The next step is combining the trapezoid lists of all the polygons. Those portions of a trapezoid that are covered up by some other trapezoid belonging to a polygon having smaller depth value are removed. This may involve splitting some trapezoids into several smaller trapezoidal pieces. The result is a set of non-overlapping trapezoids that completely describe the image to be drawn. The specification of the display is completed by filling in the background color at all other areas.

This set of non-overlapping trapezoids takes the place of both the span list and the run-length-encoded bit maps. This technique forms the first image by constructing a set of non-overlapping trapezoids as described above, and drawing these trapezoids to the frame buffer. Subsequent images are drawn by constructing a new set of non-overlapping trapezoids from the updated polygon list. This new set of non-overlapping trapezoids is compared with the old set to produce a set of difference trapezoids that describes the difference between the old and new images. These difference trapezoids are then drawn to the frame buffer.

This trapezoid technique of the polygon engine can be faster than the run-length-encoding technique because the number of trapezoids will be much smaller than the number of spans in the span list or runs in the run-length-encoded bit maps. A span describes a polygon section that is only one scanline tall, while a trapezoid describes a polygon section that can be many scanlines tall. By employing the trapezoid technique the polygon engine could perform an operation on many scanlines simultaneously instead of one at a time. A trapezoid is a more complicated object than a span. Thus while the polygon engine will perform a smaller number of operations, each operation will be more complex and take longer.

The trapezoid version of the polygon engine easily supports Z buffering. During conversion of polygons to trapezoids, each trapezoid is assigned a depth value. This trapezoid depth value is employed when generating the list of nonoverlapping trapezoids. The trapezoid having the lower depth value determines the color of the display. This Z buffering is advantageous over the prior art because less memory and computation are required. In the prior art a depth value is required for each pixel of the display. In the trapezoid technique a depth value is required only for each trapezoid. Because a typical display will include substantially fewer trapezoids than pixels, this Z buffering technique uses less memory. Further, fewer comparisons are needed in performing the depth comparison for trapezoids rather than for individual pixels. Note that the polygon may have a depth which varies along its extent requiring differing depths for different portions of the trapezoids which form the polygon. In this case a more complex depth representation may be required, such as the definition of a plane in three dimensions. These additional factors are no more difficult to handle with trapezoids than with individual pixels.

The trapezoid version of the polygon engine can support anti-aliasing. Anti-aliasing is a technique for smoothing out the edges of a shape. Pixels on the border between regions of differing colors are drawn with a color that is between the colors of the two regions. This reduces the perceived staircase effect of diagonal lines. This border may be between an object and the background or between two objects. Generally only high-end expensive systems use anti-aliasing because it is a relatively time consuming operation. One known technique for anti-aliasing renders the image into pixels of an expanded scale. Each pixel in this expanded scale represents only a part of the actual pixel. The colors of the expanded pixels are combined to determine the color of the display pixel. The display pixel color is some color between the colors of the adjacent regions based on the proportion of the two colors. This technique, called oversampling, reduces the perceived staircase effect through the combined color. Oversampling is rarely used because rendering the expanded pixels requires additional computation and memory.

The trapezoid version of the polygon engine could do anti-aliasing using the oversampling technique. The nonhorizontal sides, such as sides 330 and 331 of trapezoid 323 in FIG. 6, of the trapezoids are defined mathematically. This permits easy determination of the amount of each adjacent color to be included in the border pixels. Because the trapezoid technique of the polygon engine represents shapes, and particularly the diagonal edges, mathematically with no direct reference made to pixels or scanlines, the scale of the image doesn't affect the amount of time or memory required to render it. Note that the trapezoid compression technique permits easy determination of the diagonal lines requiring anti-aliasing.

Many computer systems, such as game systems and high-end engineering workstations, incorporate special hardware to fill polygons. Such polygon filling hardware responds to commands from the central processing unit to store a specified color value in the pixels of a defined region. This hardware can be much faster at this specialized task than the central processing unit either because it is much better at the computations involved or because it has special high bandwidth access to the frame buffer. The trapezoid version of the polygon engine used with polygon filling hardware may speed display rendering depending upon the relative speed of the central processor and the polygon filling hardware. In some cases the polygon filling hardware will be so efficient that the polygon engine would add no usefulness. In other cases it would be advantageous to employ the polygon engine in the central processing unit to identify the difference trapezoids and use the polygon filling hardware to fill those difference trapezoids. In a final set of cases, the fastest display rendering could be obtained using polygon engine to specify the trapezoids of each new scene in the manner of the initial scene and using the polygon filling hardware to fill all these trapezoids. Thus in many cases the polygon engine when used in conjunction with polygon filling hardware will be faster than convention techniques used with the special purpose hardware.

Many game systems, as well as high-end engineering workstations, incorporate special hardware to accelerate graphic displays in various ways. This hardware can be complex and expensive. The polygon engine could make use of a simple and inexpensive hardware extension to provide even faster rendering than the software-only version described above. In this hardware extension the display circuit employs a run-length-encoded bit map frame buffer instead of a standard bit map frame buffer. This modification adds very little complexity to the hardware. This hardware modification eliminates the need for the steps of comparing two run-length-encoded bit maps and drawing to the frame buffer those pixels that have changed. These steps are the most time consuming part of the display process of the polygon engine.

Figure 7:
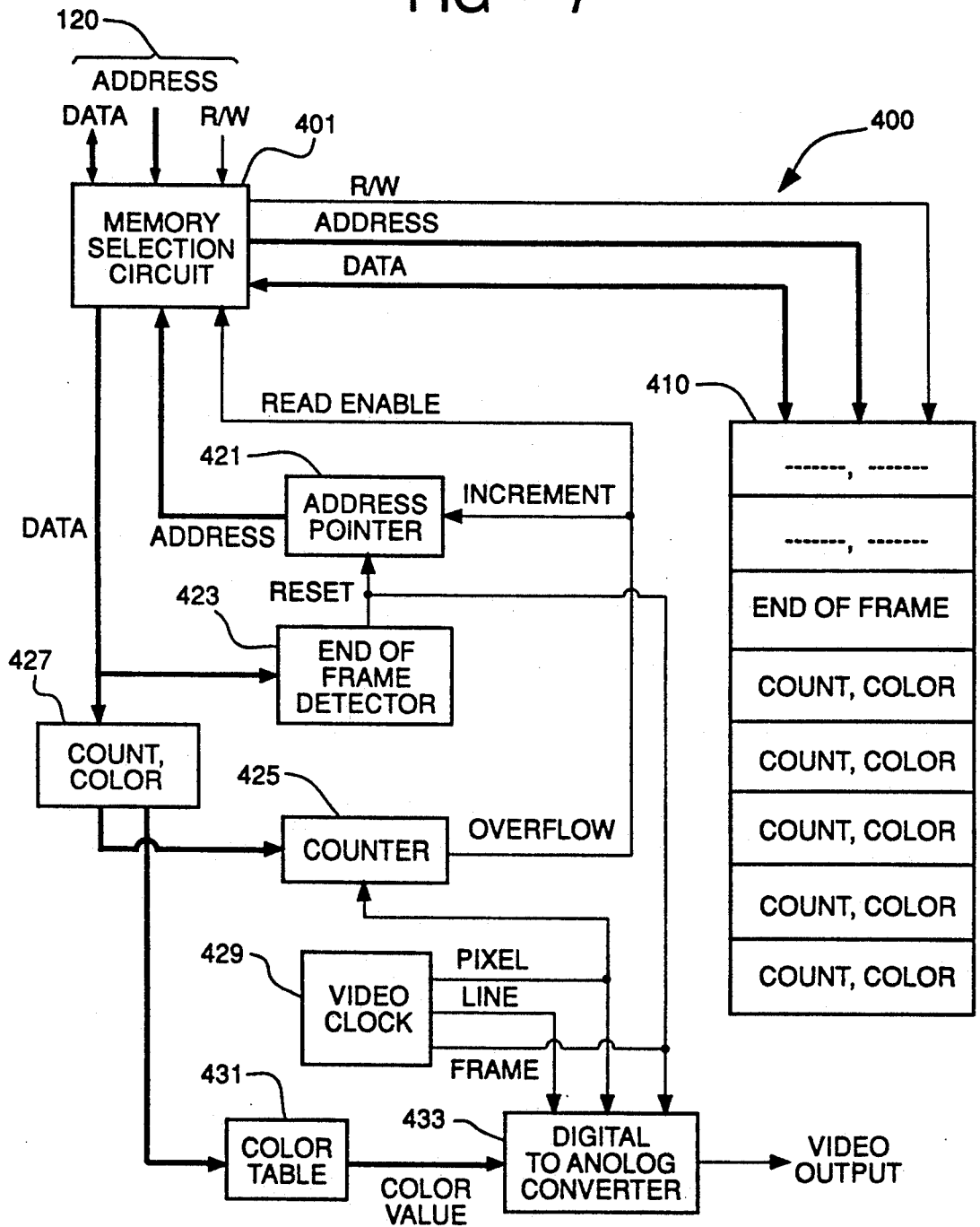
FIG. 7 illustrates in block diagram form special purpose display hardware which produces a video display from a run-length-encoded bit map.

FIG. 7 illustrates the hardware of this extension of the polygon engine method just described. Display hardware 400 illustrated in FIG. 7 replaces frame buffer 131 and display hardware 133 of FIG. 1. Display hardware 400 includes a run-length-encoded bit map frame buffer 410. Run-length-encoded bit map frame buffer 410 stores data defining the display as elements in a run-length-encoded bit map. Each element in run-length-encoded bit map frame buffer 410 includes a (count, color) pair just as each element in a run-length-encoded bit map.

The run-length-encoding technique does not yield a defined size for the frame buffer as is the case for a conventional frame buffer. The amount of memory required for complete specification of the display would be a variable amount depending on the effective compression rate of the run-length-encoding technique as applied to that display. Run-length-encoded bit map frame buffer 410 should have a size sufficient to specify an entire display assuming a predetermined minimum effective compression ratio. Note that the last entry in run-length-encoded bit map frame buffer 410 is an end-of-frame entry. This end-of-frame entry marks the end of valid data. Data at addresses beyond the end-of-frame entry are ignored by display hardware 400 when rendering an image.

Memory selection circuit 401 controls access to run-length-encoded bit map frame buffer 410. Memory selection circuit 401 grants priority for reading from run-length-encoded bit map frame buffer 410. Memory selection circuit 401 permits central processing unit 110 to read from or write to the run-length-encoded bit map frame buffer 410 on a noninterfering basis via system bus 120. This is similar to the process of a conventional frame buffer.

The display rendering process occurs as follows. At the beginning of each frame address pointer 421 is reset to store the address of the first entry in the run-length-encoded bit map frame buffer 410. Next, memory selection circuit 401 permits the recall of the run-length-encoded entry at this address by supplying a read signal and the address stored in the address pointer 421 to the selected run-length-encoded bit map frame buffer. This data is then stored in run-length-encoded element latch 427. The count part of this memory entry stored in latch 427 is further supplied to counter 425. The color part of the memory entry stored in latch 427 is further supplied to color table 431. Color table 431 recalls a color value corresponding to the color data supplied. Digital to analog converter 433 produces an analog video signal corresponding to the supplied color value under control of the pixel, line and frame signals from video clock 429. This analog video signal could consist of separate primary color signals (Red, Green and Blue) or of a composite video signal. This analog video signal is supplied to display 135 in the manner illustrated in FIG. 1.

Counter 425 determines when to recall the next run-length-encoded entry. Counter 425 is incremented by the pixel clock of video clock 429. Thus counter 425 increases after the color value of each pixel is supplied to digital to analog converter 433. If the count of counter 425 is less than the count data from latch 427, then nothing happens. Upon rendering the next pixel, color table 431 still receives the same color and supplies the same color value to digital to analog converter 433. Thus the display shows the same color. If the count of counter 425 exceeds the count data from latch 427, then counter 425 produces an overflow signal. This overflow signal increments the memory address stored in address pointer 421 and enables memory selection circuit 401 to recall the next (count, color) entry in the run-length-encoded bit map frame buffer 410. It can be readily understood that display hardware 400 produces the display in accordance with the recalled run-length-encoded elements.

Display hardware 400 includes end of frame detector 423. End of frame detector 423 receives the data recalled from the selected run-length-encoded bit map frame buffer in parallel with latch 427. End of frame detector 423 compares this received data with a predetermined end of frame marker. As previously noted, each run-length-encoded bit map frame buffer has an end-of-frame entry at the end of the valid data. Upon detection of this end-of-frame entry, end of frame detector 423 resets address pointer 421 to the first memory address. Thus the frame repeats. Note that it is also possible to reset address pointer 421 via the frame clock from video clock 429.

This technique grants central processing unit 110 greater effective access to the display memory than in a conventional frame buffer. First, the amount of data needed to specify an entire display is less in the run-length-encoded format than in a complete bit map. Thus central processing unit 110 requires fewer read or write cycles to run-length-encoded bit map frame buffer 410 than would be required to a conventional bit map. For example, central processing unit 110 could copy an entire auxiliary run-length-encoded bit map into run-length-encoded bit map frame buffer 410 in less time than required to copy a conventional auxiliary frame buffer. Second, the display process does not require a read from run-length-encoded bit map frame buffer 410 for each pixel. For every pixel with a repeated color specified in the run-length-encoded form, there is a pixel cycle where no read operation is required from run-length-encoded bit map frame buffer 410. Display hardware 400 grants a read/write cycle to central processing unit 110 for each such pixel with a repeated color. Thus central processing unit 110 will have greatly enhanced access to the display.

I claim:

1. A method of rendering a plurality of objects which form a computer graphic display into a frame buffer having a plurality of scan lines comprising the steps of:
   specifying the objects into a list for the next frame of the display, each object comprising a plurality of pixels, each pixel of the object having an identical color;
   converting each object of said list of objects into a list of spans, each span corresponding to a horizontal line of the display for the next frame, each span defining a group of horizontally adjacent pixels of a corresponding single object in terms of horizontal offset, pixel count, depth, and color;
   merging said list of spans for all objects of said list of objects into a single master list of spans, whereby each span for each object for a particular horizontal line appears in said master list of spans for that horizontal line;
   resolving the depth of said spans in said master list by choosing the color for each span of overlap from the overlapping span having the least depth value;
   converting said master list of spans into a set of run-length-encoded bit map lines for the next frame, each run-length-encoded bit map line defining all sets of horizontally adjacent pixels having the same color, each set including the number of pixels and the color for that set; and
   updating the frame buffer by writing each run-length-encoded bit map line into a corresponding scan line of the plurality of scan lines in the frame buffer.

2. The method of rendering a computer graphic display as claimed in claim 1, further comprising the step of:
   sorting said list of objects for the next frame in left to right order prior to converting each object into a list of spans.

3. The method of rendering a computer graphic display as claimed in claim 1, wherein said step of converting said lists of spans for said list of objects into a set of run-length-encoded bit map lines for the next frame further includes:
   sorting said spans for each horizontal line of said master list of spans in left to right order; and
   filling any remaining unspecified pixels with a predetermined background color.

4. The method of rendering a computer graphic display as claimed in claim 1, wherein said step of updating the frame buffer includes:
   comparing said set of run-length-encoded bit map lines for the next frame with the set of run-length-encoded bit map lines for the current frame to determined each pixel having a color different in the next frame than in the present frame; and
   writing into corresponding locations in the frame buffer only the color in the next frame of those pixels having a color different in the next frame than in the present frame.

5. A method of rendering a computer graphic display into a frame buffer having a plurality of scan lines comprising the steps of:
   specifying a list of polygons for the next frame of the display, each polygon having a corresponding color;
   converting each polygon of said list of polygons into a set of trapezoids whose parallel sides are horizontal;
   converting said set of trapezoids for all polygons of said list of polygons into a set of nonoverlapping trapezoids;
   updating the frame buffer to correspond to said set of nonoverlapping trapezoids for the next frame by comparing the set of nonoverlapping trapezoids for the current frame with the set of nonoverlapping trapezoids for the next frame;
   determining a set of difference trapezoids having a color different in the next frame than in the present frame; and
   storing a corresponding color only into each pixel represented by said difference trapezoids.

6. The method of rendering a computer graphic display as claimed in claim 5, wherein said step of converting each polygon of said list of polygons into a set of trapezoids consists of drawing horizontal lines through said polygons such that at least one end point of each horizontal line is a vertex point of the polygon to which it is associated.

7. The method of rendering a computer graphic display as claimed in claim 5, further comprising the step of:
   sorting said list of polygons for the next frame in left to right order prior to converting each polygon into a set of trapezoids.

8. The method of rendering a computer graphic display as claimed in claim 5, wherein:
said step of converting said set of trapezoids for all polygons of said list of polygons into a set of nonoverlapping trapezoids includes
assigning a depth value to each trapezoid of the set of trapezoids converting from each polygon of said list of polygons.

9. The method of rendering a computer graphic display as claimed in claim 8, wherein:
said step of converting the set of trapezoids for all polygons of said list of polygons into a set of nonoverlapping trapezoids includes
comparing depth values for overlapping trapezoids and discarding trapezoids with larger depth values.

10. The method of rendering a computer graphic display as claimed in claim 5, wherein said step of updating the frame buffer includes:
filling any pixels not within said set of nonoverlapping trapezoids for the next frame with a predetermined background color.

11. The method of rendering a computer graphic display as claimed in claim 5, wherein said step of updating the frame buffer includes:
storing a corresponding color into each pixel of each of said nonoverlapping trapezoids for the next frame using special purpose polygon filling hardware.

12. The method of rendering a computer graphic display as claimed in claim 5, wherein said step of updating the frame buffer includes:
rendering each nonhorizontal side of each of said set of nonoverlapping trapezoids in the next frame in expanded pixels at an expanded scale relative to the frame buffer, whereby plural expanded pixels correspond to a single pixel in the frame buffer, and
writing into each pixel in the frame buffer corresponding to the nonhorizontal side of each of said set of nonoverlapping trapezoids in the current frame a combination of the color of each of the trapezoids on either side of the nonhorizontal side of each of said set of nonoverlapping trapezoids.

13. The method of rendering a computer graphic display as claimed in claim 5, each trapezoid comprised of a plurality of individual pixels each having a color, wherein the step of converting said set of trapezoids for all polygons of said list of polygons into a set of nonoverlapping trapezoids is accomplished by choosing the color for each trapezoid of overlap from the overlapping trapezoid having the least depth value.

* * * * *

UNITED STATES PATENT AND TRADEMARK OFFICE
CERTIFICATE OF CORRECTION

PATENT NO. : 5,295,235
DATED : March 15, 1994
INVENTOR(S) : Newman

It is certified that error appears in the above-indentified patent and that said Letters Patent is hereby corrected as shown below:

Column 3, line 23, delete "consist" and insert --consists--;

Column 3, line 25, after "recalled", insert --run-length-encoded--;

Column 9, line 58, after "4", insert --,--;

Column 10, line 2, delete "a" and insert --an--.

Signed and Sealed this

Twenty-sixth Day of July, 1994

Attest:

BRUCE LEHMAN

Attesting Officer

Commissioner of Patents and Trademarks